United States Patent
Chakaravarthy et al.

(10) Patent No.: US 12,436,799 B2
(45) Date of Patent: Oct. 7, 2025

(54) COLD-START SERVICE PLACEMENT OVER ON-DEMAND RESOURCES

(71) Applicant: International Business Machines Corporation, Armonk, NY (US)

(72) Inventors: Venkatesan Thirumalai Chakaravarthy, Bangalore (IN); Ashok Pon Kumar Sree Prakash, Bangalore (IN); Saritha Vinod, Bangalore (IN); Yogish Sabharwal, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 17/551,520

(22) Filed: Dec. 15, 2021

(65) Prior Publication Data
US 2023/0185604 A1    Jun. 15, 2023

(51) Int. Cl.
G06F 9/48    (2006.01)
G06F 9/50    (2006.01)
H04L 67/10   (2022.01)

(52) U.S. Cl.
CPC .......... G06F 9/4881 (2013.01); G06F 9/5044 (2013.01); H04L 67/10 (2013.01); G06F 2209/501 (2013.01)

(58) Field of Classification Search
CPC ................. G06F 9/4881; G06F 9/5044; G06F 2209/501; H04L 67/10
See application file for complete search history.

(56) References Cited

U.S. PATENT DOCUMENTS

| | | |
|---|---|---|
| 7,464,147 B1 | 12/2008 | Fakhouri et al. |
| 8,423,998 B2 | 4/2013 | Isci et al. |
| 9,602,573 B1 | 3/2017 | Abu-Ghazaleh et al. |
| 10,067,801 B1 | 9/2018 | Wagner |
| 2006/0235664 A1 | 10/2006 | Vinberg et al. |

(Continued)

OTHER PUBLICATIONS

Mell, Peter, et al., The NIST Definition of Cloud Computing, National Institute of Standards and Technology, U.S. Department of Commerce, NIST Special Publication 800-145, Sep. 2011.

(Continued)

*Primary Examiner* — Wissam Rashid
(74) *Attorney, Agent, or Firm* — Ryan, Mason & Lewis, LLP (57) ABSTRACT

Methods, systems, and computer program products for cold-start service placement over on-demand resources are provided herein. A computer-implemented method includes obtaining a performance requirement profile comprising performance requirements of a service that vary over time; determining a plurality of incarnations for the service, wherein each incarnation is associated with a level of performance provided by the incarnation for the service, resource requirements of the incarnation, and a type of computing node the incarnation is configured to execute on; identifying computing nodes having different types and different resource capacities; jointly scheduling (i) the computing nodes and (ii) one or more of the incarnations on the computing nodes over a time interval such that a cumulative level of performance of the incarnations scheduled at each timepoint in the time interval satisfies the performance requirement profile of the service.

20 Claims, 8 Drawing Sheets

(56) References Cited

U.S. PATENT DOCUMENTS

| | | | |
|---|---|---|---|
| 2014/0019965 | A1 | 1/2014 | Neuse et al. |
| 2014/0019966 | A1 | 1/2014 | Neuse et al. |
| 2014/0164594 | A1 | 6/2014 | Crowell et al. |
| 2015/0135185 | A1* | 5/2015 | Sirota .................. H04L 67/10 718/103 |
| 2019/0163517 | A1 | 5/2019 | Fontoura |
| 2019/0317826 | A1 | 10/2019 | Jain et al. |

OTHER PUBLICATIONS

Klimovic, Ana, et al. "Pocket: Elastic ephemeral storage for serverless analytics." 13th {USENIX} Symposium on Operating Systems Design and Implementation ({OSDI} 18), 2018.

Minaie, Nick, et al., "Right-sizing resources and avoiding unnecessary costs in Amazon SageMaker", AWS Machine Learning Blog, available at https://aws.amazon.com/blogs/machine-learning/right-sizing-resources-and-avoiding-unnecessary-costs-in-amazon-sagemaker/, published Sep. 11, 2020.

Panigrahy, Rina, et al. "Heuristics for vector bin packing." Microsoft Research, available at https://www.microsoft.com/en-us/research/wp-content/uploads/2011/01/VBPackingESA11.pdf, Jan. 1, 2011.

Gabay, Michael, and Sofia Zaourar. "Vector bin packing with heterogeneous bins: application to the machine reassignment problem." Annals of Operations Research 242.1, Jul. 2016, pp. 161-194.

Silva, Pedro, et al., "Efficient Heuristics for Placing Large-Scale Distributed Applications on Multiple Clouds." CCGrid 2016—16th IEEE/ACM International Symposium on Cluster, Cloud, and Grid Computing, May 2016, Cartagena, Colombia.

Chekuri, Chandra, and Sanjeev Khanna, "On multi-dimensional packing problems." Published in SIAM Journal on Computing, vol. 33, Issue 4, Jan. 1, 2004, pp. 837-851.

Patt-Shamir, Boaz, and Dror Rawitz. "Vector bin packing with multiple-choice." Discrete Applied Mathematics 160.10-11, Jul. 1, 2012, pp. 1591-1600.

Coffman, Jr., EG, et al., "Approximation algorithms for bin packing: a survey." Approximation algorithms for NP-hard problems, 1996, Chapter 2, pp. 46-93.

Zhu, Timothy, et al., "Workloadcompactor: Reducing datacenter cost while providing tail latency SLO guarantees", Proceedings of the 2017 Symposium on Cloud Computing, Sep. 24, 2017.

Dräxler, Sevil, et al., "Joint optimization of scaling and placement of virtual network services", 2017 17th IEEE/ACM International Symposium on Cluster, Cloud and Grid Computing (CCGRID). IEEE, May 14, 2017.

Horovitz, Shay, et al., "Efficient cloud auto-scaling with SLA objective using Q-learning." 2018 IEEE 6th International Conference on Future Internet of Things and Cloud (FiCloud), IEEE, Aug. 6, 2018.

Imdoukh, Mahmoud, et al., "Machine learning-based auto-scaling for containerized applications", Neural Computing and Applications 32.13, Jul. 2020, pp. 9745-9760.

Nadgowda, Shripad, et al., "Paracloud: Bringing application insight into cloud operations", 9th {USENIX} Workshop on Hot Topics in Cloud Computing (HotCloud 17), 2017.

Taft, Rebecca, et al. "STeP: scalable tenant placement for managing database-as-a-service deployments." Proceedings of the Seventh ACM Symposium on Cloud Computing, Oct. 5, 2016.

Piraghaj, Sareh Fotuhi, et al. "A framework and algorithm for energy efficient container consolidation in cloud data centers." 2015 IEEE International Conference on Data Science and Data Intensive Systems. IEEE, Dec. 2015.

Lv, Liang, et al. "Communication-aware container placement and reassignment in large-scale internet data centers." IEEE Journal on Selected Areas in Communications 37.3, Mar. 3, 2019, pp. 540-555.

Mao, Ying, et al., "DRAPS: Dynamic and Resource-Aware Placement Scheme for Docker Containers in a Heterogeneous Cluster", arXiv preprint arXiv:1805.08598. May 2, 20182.

Nanda, Saurav, and Thomas J. Hacker, "Racc: resource-aware container consolidation using a deep learning approach." Proceedings of the First Workshop on Machine Learning for Computing Systems, Jun. 12, 2018.

Menache, Ishai, et al., "On-demand, spot, or both: Dynamic resource allocation for executing batch jobs in the cloud." 11th International Conference on Autonomic Computing ({ICAC} 14), Jun. 2014.

"AWS Solutions Library—Vetted solutions and guidance for business and technical use cases", Dec. 1-5, 13 pages, https://aws.amazon.com/solutions/cost-optimization-ec2-right-sizing/.

Github, "OpenCost—your favorite open source cost monitoring tool for Kubernetes and cloud spend", Jun. 25, 2025, 05 pages, https://github.com/kubecost/cost-model.

Github, "Pravega Tools", Tooling for Pravega cluster administration, Jun. 25, 2025, 02 pages, https://github.com/pravega/pravega-tools.

Gordon Brandon, "Rightsizing VMs with vRealize Operations", VMware Cloud Management, Jan. 15, 2020, 13 pages, https://blogs.vmware.com/management/2020/01/rightsizing-vms-with-vrealize-operations.html.

IBM Kubecost, "You can't optimize what you can't see", Jun. 25, 2025, 08 pages, https://kubecost.com/.

Spazzoli Raffaele, "How Full is my Cluster—Part 4: Right-Sizing Pods with Vertical Pod Autoscaler", Red Hat Blog, Jan. 30, 2019, 11 Pages, https://www.redhat.com/en/blog/how-full-is-my-cluster-part-4-right-sizing-pods-with-vertical-pod-autoscaler.

Spot Documentation, Use Right Sizing, Jun. 25, 2025, 06 pages, https://docs.spot.io/ocean/tutorials/ocean-for-aws/right-sizing-usage/.

Spotinst Ocean, "Spot Documentation—How to use Spot products", Right Sizing, Jun. 25, 2025, 07 pages, https://docs.spot.io/ocean/concepts/ocean-cloud/right-sizing/.

* cited by examiner

| Node-types | CPU | RAM | Disk | Fixed Cost | Per-hour price |
|---|---|---|---|---|---|
| Type - 1 | 8 cores [Intel –i5] | 8 GB [DDR 2] | 128 GB | $40 | $ 0.05 |
| Type - 2 | 8 cores [Intel –i7] | 16 GB [DDR 4] | 512 GB | $30 | $ 0.5 |
| Type-3 | 16 cores [Intel i-5] | 16 GB [DDR 2] | 256 GB | $50 | 0.1 |

402

| Interval | Cost |
|---|---|
| [1-7] | $100 |
| [5-24] | $300 |
| [1-24] | $400 |

404

| Interval | Cost |
|---|---|
| [1-8] | $300 |
| [10-20] | $400 |
| [1-24] | $600 |

406

| Interval | Cost |
|---|---|
| [1-10] | $200 |
| [12-20] | $250 |
| [1-24] | $500 |

COLD-START SERVICE PLACEMENT OVER ON-DEMAND RESOURCES

BACKGROUND

The present application generally relates to information technology and, more particularly, to resource management techniques.

Organizations are increasingly migrating applications to the cloud. Typically, the application includes multiple services, where each service has specific resource requirements for multiple types of resources.

SUMMARY

In one embodiment of the present disclosure, techniques for cold-start service placement over on-demand resources are provided. An exemplary computer-implemented method includes obtaining a performance requirement profile comprising performance requirements of at least one service that vary over time; determining a plurality of service incarnations for the at least one service, wherein each service incarnation is associated with a level of performance provided by the service incarnation for the at least one service, resource requirements of the service incarnation, and a type of computing node the service incarnation is configured to execute on; identifying a plurality of computing nodes having different types and different resource capacities; jointly scheduling (i) the plurality of computing nodes and (ii) one or more of the service incarnations on the plurality of computing nodes over a time interval such that a cumulative level of performance of the service incarnations scheduled at each timepoint in the time interval satisfies the performance requirement profile of the at least one service, wherein the scheduling is based at least in part on the resource requirements of the plurality of service incarnations and the resource capacities of each of the computing nodes; and triggering execution of the at least one service in accordance with the scheduling.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Users and organizations are increasingly migrating software applications to the cloud. For example, an application may include multiple different services, and each of these services can have specific requirements with respect to multiple types of computing resources. Cloud providers often offer multiple types of nodes (e.g., VM nodes or bare-metal nodes), where each type of node has trade-offs in terms of resources and cost.

By way of example, consider an application that has three services (service A, service B, and service C), and the applications have the following minimum requirements: service A requires a single core processer, 8 GB memory, and 100 GB of disk storage; service B requires a four-core processor, 10 GB of memory, and 200 GB of disk storage; and service C requires a two-core processor, 5 GB of memory, and 80 GB of disk storage. Also consider a service provider which offers the following two types of nodes (or services): a first type of node providing a sixteen-core processor, 32 GB of memory, and 256 GB of disk space; and a second type of node providing a four-core processor, 16 GB of memory, and 512 GB of disk space. In such an example, it is important to determine the proper quantity and types of nodes that are needed to execute the services. Additionally, each type of node may be associated with a different cost, which can complicate the process of looking to migrate an application to the cloud. Oversizing or undersizing the cloud resources can lead to performance inefficiencies (including service downtime events), as well as increased costs to the user.

One or more embodiments described herein include a service placement process that comprises constructing a cluster of different types of nodes, placing services on the nodes so that the total demand on a given node does not exceed a capacity of the node along any resource (or dimension), while, optionally, minimizing the total cost of the cluster.

As described herein, an exemplary embodiment includes placement of services on clusters while satisfying performance requirements of the services. The clusters can provide on-demand resources based on different types of nodes and services. In at least some embodiments, the resource demands of the services and capacity of the nodes are multi-dimensional (e.g., corresponding to multiple types of computing resources, such as memory and computing resources). The performance requirements of a given service can vary over time, and the performance of the service can depend on its incarnation, which generally refers to an instance of the service with a specified container configuration. For example, a service may be realizable via multiple incarnations, where each incarnation provides the same service, but differs from the other incarnations in terms of its resource requirements, the type of node it needs to execute on, and the performance it offers (e.g., measured by throughput of transactions per second).

The performance of an incarnation, in some embodiments, is determined based on its resource demand and a node type on which the incarnation is placed. Nodes can be purchased on-demand, and thus can provide computing resources for a partial duration of a particular timeline. In one or more embodiments, the cost of the node can depend on its duration and position on the timeline.

One or more embodiments also include determining a set of different types of nodes, scheduling positions for the different types of nodes, and filling each of the nodes with incarnations of services to maximize performance coverage. Such embodiments can also include selecting, from among the nodes that are filled with incarnations, the node yielding the most performance coverage relative to the cost of the node. The performance requirements of the services placed in the selected node are reduced, and the process is repeated until the performance requirements of all of the services are satisfied. In some embodiments, the process for filling the nodes with incarnations can include considering candidate scheduling positions for each service incarnation, selecting the incarnation yielding the maximum coverage to resource utilization ratio, and reducing capacity of the node by an amount of the demand corresponding to the selected incarnation.

Figure 1:
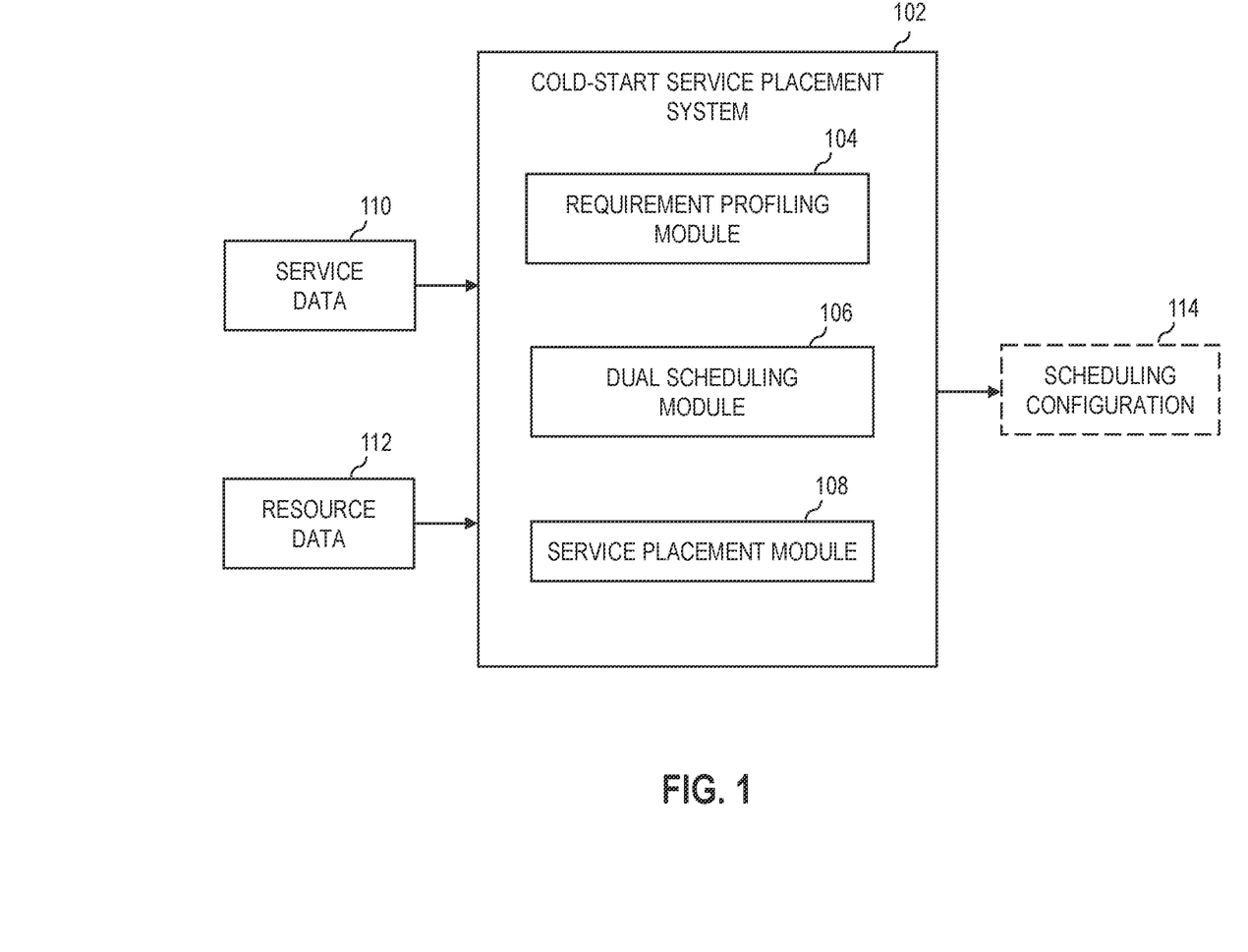
FIG. 1 is a diagram illustrating a system architecture in accordance with exemplary embodiments.

FIG. 1 is a diagram illustrating a system architecture in accordance with exemplary embodiments. By way of illustration, FIG. 1 depicts a cold-start service placement system 102, which includes a requirement profiling module 104, a dual scheduling module 106, and a service placement module 108. In some embodiments, the cold-start service placement system 102 obtains input in the form of service data 110 and resource data 112. The service data 110 may include performance requirements of a plurality of different services, and the resource data 112 may include characteristics of nodes that can provide on-demand computing resources for executing the services.

Generally, the requirement profiling module 104 determines a time-based requirement profile for each of the different services, and the dual scheduling module 106 jointly scheduling the nodes and incarnations of the services within the nodes. Optionally, a scheduling configuration 114 which indicates the scheduling determined by the dual scheduling module 106 can be output to one or more of a system and a user by the cold-start service placement system 102. The service placement module 108 places the services on the nodes to be executed in accordance with the scheduling configuration 114. The functionality of modules 104, 106, and 108 are described in further detail elsewhere herein.

At least some embodiments described herein relate to a process for initially placing services of an application in a consolidated manner in a cluster, which can then be followed by online monitoring. Existing techniques primarily relate to online process and cannot be directly applied to a "cold-start" context.

Computing nodes that provide on-demand resources can vary in quantity as well as quality of resources. For example, a node may have the same quantity of processing cores, but the type of processor on one node may be high quality. Incarnations of services can also be executed by using different container configurations. Incarnations can be selected to meet a particular performance demand (e.g., specified in transactions per second (TPS)). Generally, there is a trade-off between size of a container for an incarnation and the performance of the service corresponding to the incarnation. Accordingly, nodes can be obtained or purchased, and replicas of the services can be placed on the nodes to minimize the cost of the resulting cluster, for example.

Figure 2:
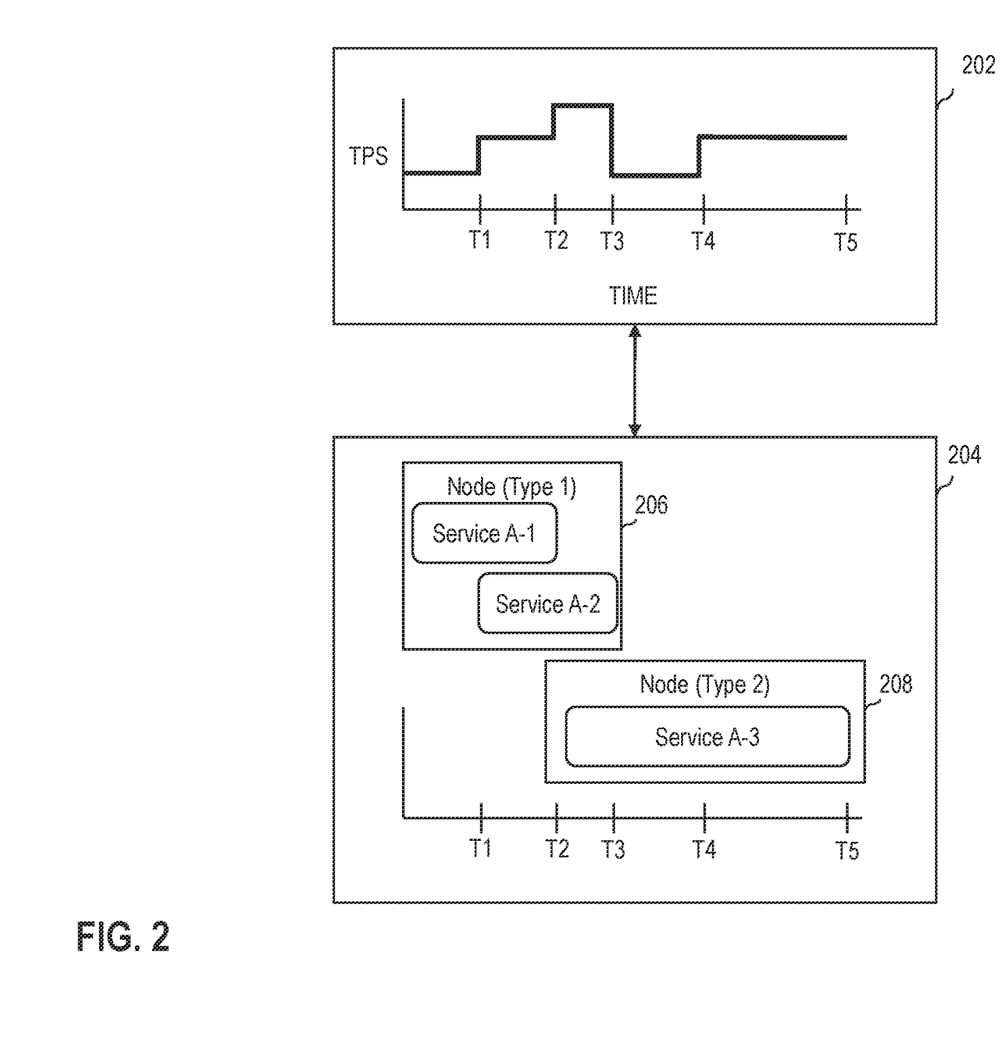
FIG. 2 is a diagram illustrating an example of scheduling a service over on-demand resources in accordance with exemplary embodiments.

FIG. 2 is a diagram illustrating an example of cold-start service placement over on-demand resources for a service in accordance with exemplary embodiments. More specifically, FIG. 2 depicts a requirements profile 202 for a given service, which is based on performance requirements. In this example the requirements profile 202 shows that the performance requirements change at different points along the timeline (i.e., at times T1, T2, T3, T4, and T5). In some embodiments, a dual scheduling process is performed that schedules both nodes and service incarnations in such a way that satisfies the requirements profile 202 for the entire timeline. In some embodiments, the dual scheduling process can account for different cost configurations for the nodes, such as nodes having non-linear costs (e.g., where a node scheduled during a longer duration is less expensive than a node scheduled on a shorter duration) and/or when the cost changes along the timeline (e.g., node is less expensive during the night than the day), and costs of migrating incarnations to different nodes. In the FIG. 2 example, the resulting scheduling configuration 204 for the service includes two nodes 206, 208 that are scheduled during respective portions of the timeline. Specifically, node 206 includes two incarnations for the service (denoted Service A-1 and Service A-2), and node 208 includes one incarnation (Service A-3). It is noted that each of the nodes 206 and 208 are scheduled for only portions of the timeline and provide resources to meet the requirements of the requirements profile 202.

Figure 3:
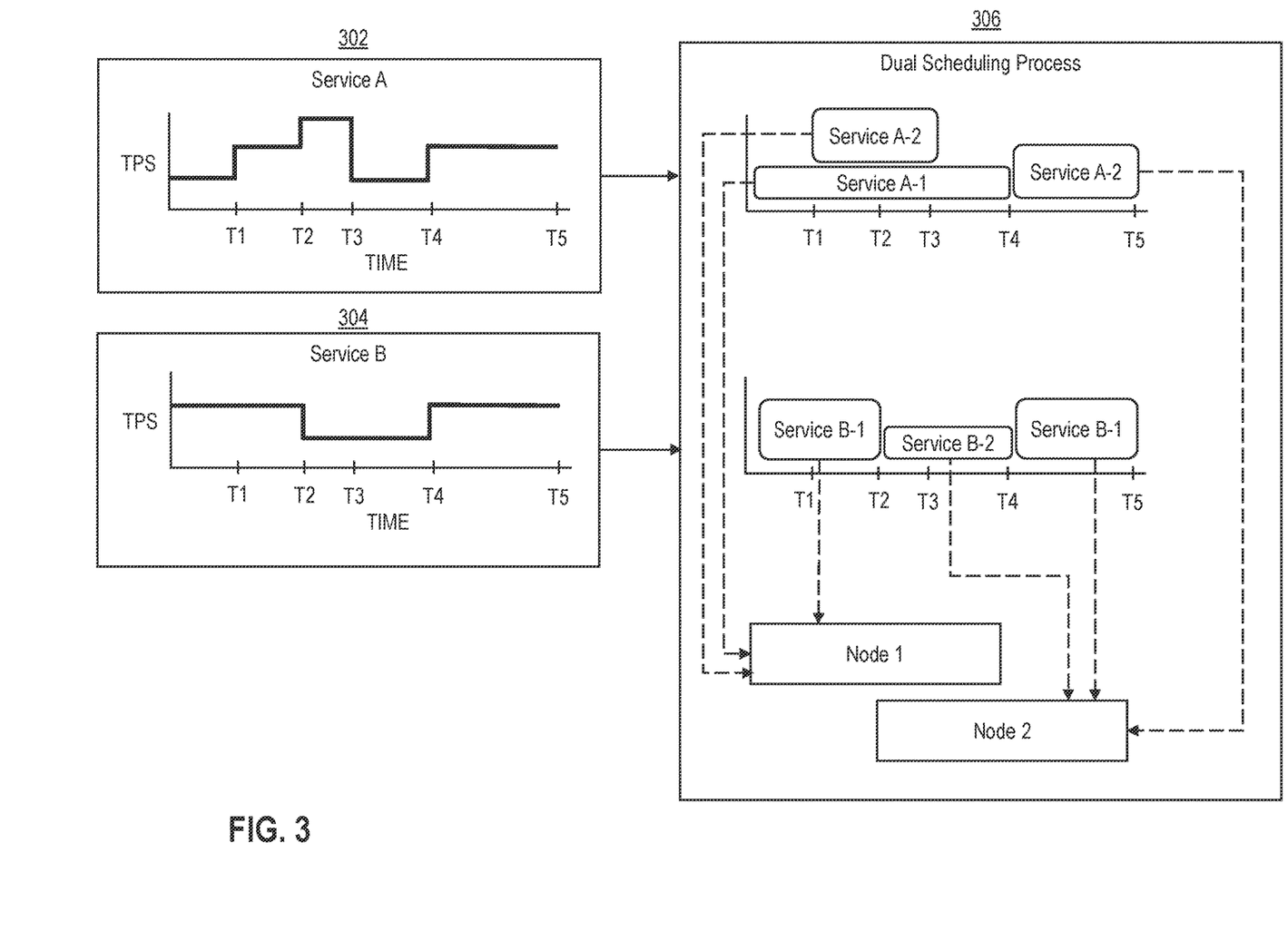
FIG. 3 is a diagram illustrating an example of dual scheduling and placement of two services across on-demand resources in accordance with exemplary embodiments.

FIG. 3 is a diagram illustrating an example of dual scheduling and placement of two services across on-demand resources in accordance with exemplary embodiments. More specifically, FIG. 3 depicts a requirements profile 302 for service A and a requirements profile 304 for service B. The requirements profiles 302 and 304 are obtained as input to the dual scheduling process 306, such that incarnations of the service A and service B must cover the respective requirements profiles 302 and 304. Additionally, the dual scheduling process 306 also considers capacity constraints when placing the incarnations on nodes. More specifically, the dual scheduling process determines incarnations of service A and service B along the timeline. In FIG. 3, the incarnations include: Service A-2, Service A-1, Service B-1, and Service B-2, where the height of the boxes corresponding to the incarnations represent resource demand. In this example, the dual scheduling process 306 results in node 1 being scheduled until time T5 with service A-1, service A-2, and service B-1, and node 2 being scheduled from T2 with service A-2, service B-1, and service B-2.

Figure 4:
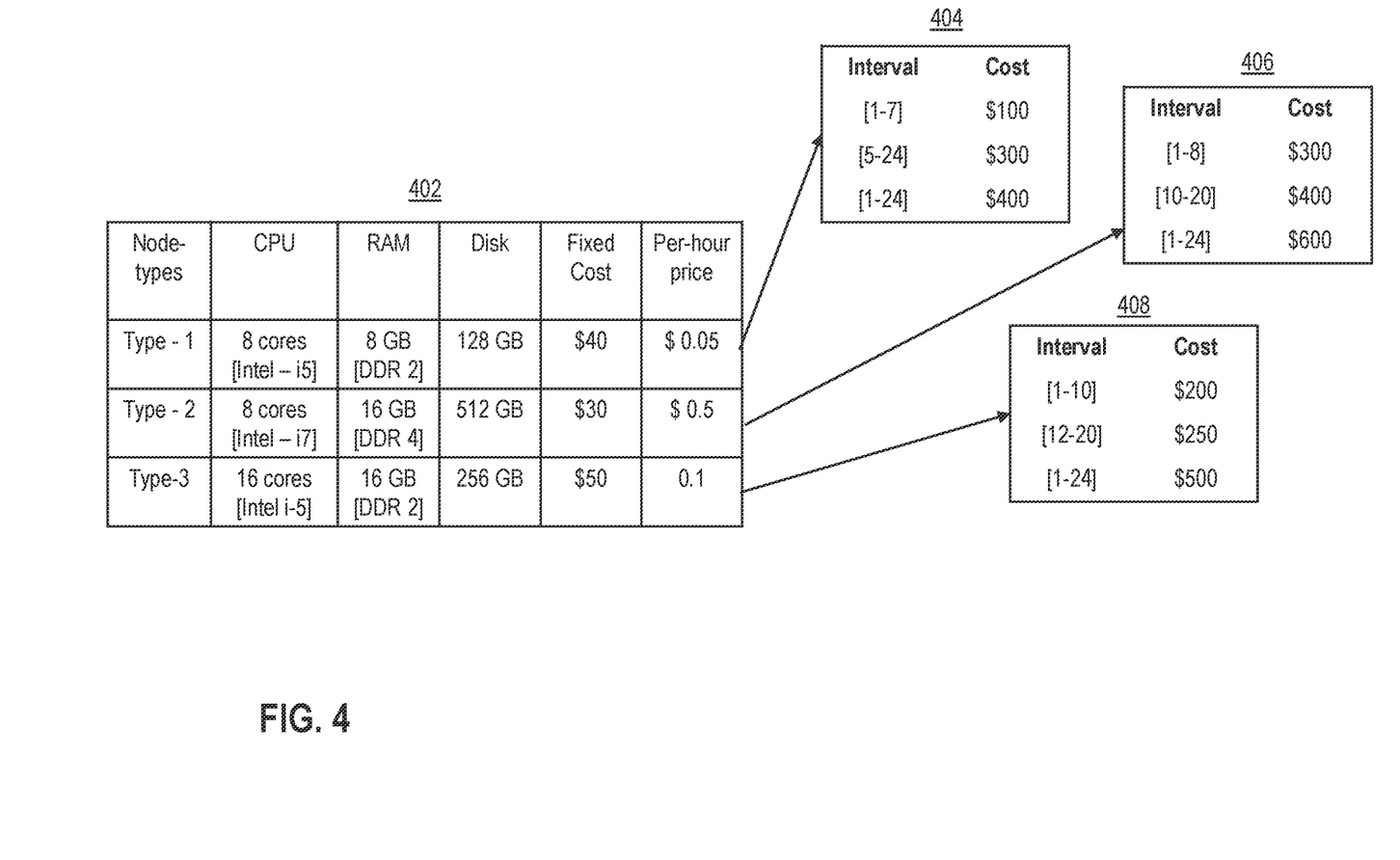
FIG. 4 shows an example of computing costs for different types of nodes in accordance with exemplary embodiments.

In some embodiments, the dual scheduling process can account for the node costs and the incarnation costs. FIG. 4 shows an example of computing costs for different types of nodes in accordance with exemplary embodiments. a node cost can be computed per time-step for a given interval of time. In this example, the specifications for the cost of different types of computing resources are provided in table 402 for three different types of nodes. For each type a node, the cost for different intervals can be computed, as shown in tables 404, 406, and 408, for example.

Some embodiments can also use multiple incarnations, which are not required to start instantaneously. For instance, the incarnations can involve migrating a service from one node to another by determining an installation cost with each incarnation, which can be factored into the dual scheduling process.

Accordingly, in some embodiments a process for service placement over on-demand resources can be performed based on at least a portion of the following inputs: TPS requirement profiles of services, resource demands of incarnations; node-type placement of incarnations; TPS achieved by incarnations; installation costs of incarnations; resource capacities of node types, cost per timestep of nodes and/or interval cost of nodes. Accordingly, execution units can correspond to nodes that are scheduled on the relevant timeline along with the scheduled incarnations packed within each node. The process can minimize costs based on the incarnation installation costs and node costs.

The service placement process, in some embodiments, includes a greedy procedure that is performed in a loop until TPS requirements of all services are covered. At each iteration, the greedy procedure selects the most effective execution unit (e.g., based on costs), and computes the remaining demands for all services. By way of example, the most cost-effective execution unit may be determined based on the following algorithm:

1) For each type of node that is scheduled on the timeline:
   a) Solve an incarnation packing problem:
      i) Find the set of incarnations that can be packed yielding the maximum TPS coverage.
   b) Compute cost-effectiveness of each execution unit.
2) Select the most-cost effective execution unit.

Also, given a node b scheduled on the time interval, the node can be filled with incarnations based on the following greedy packing algorithm:

1) For an incarnation u and a given scheduling position define:
   a) Resource utilization as the product of its duration and aggregate normalized demand using the following equation: duration(u)×$\Sigma_{dim\ d}$ demand(u, d)/capacity(b, d).
2) Loop the following steps until no more incarnations can be packed in b:
   a) Consider each service incarnation u and its possible scheduling positions.
   b) Compute TPS coverage of the incarnation with respect to the remaining demand.
   c) Compute resource utilization of the incarnation.
   d) Select the incarnation yielding the maximum coverage to resource utilization ratio.
   e) Reduce resource availability of the node.

In at least one embodiment, the service placement process can be framed as a multi-set multi-cover problem. For example, the multi-set multi-cover problem can be modeled as: each element has req(e), which is a number of times the element is to be covered; each multi-set can cover an element multiple times; find a solution covering the requirements of all elements while minimizing cost (e.g., based on a greedy process). In the multi-set multi-cover problem each service-timestep pair (A, t) forms an element, where (A, t) must be covered TPS(A, t) times, and the number of elements is equal to timesteps multiplied by the number of services. The sets in the problem correspond to execution units, where there are an exponential number of feasible units.

Figure 5:
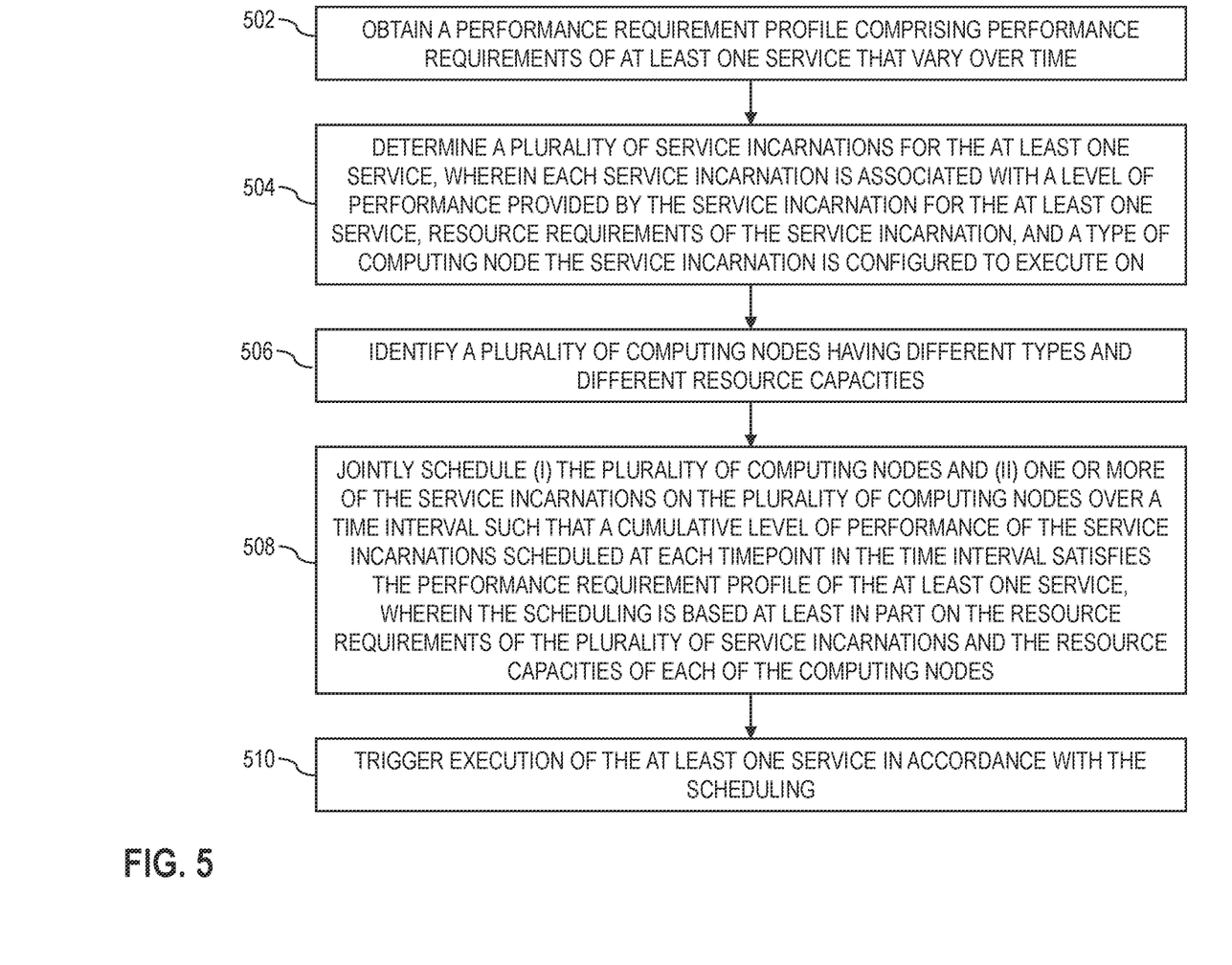
FIG. 5 is a flow diagram illustrating techniques for cold-start service placement over on-demand resources in accordance with exemplary embodiments.

FIG. 5 is a flow diagram illustrating techniques in accordance with exemplary embodiments. Step 502 includes obtaining a performance requirement profile comprising performance requirements of at least one service that vary over time. Step 504 includes determining a plurality of service incarnations for the at least one service, wherein each service incarnation is associated with a level of performance provided by the service incarnation for the at least one service, resource requirements of the service incarnation, and a type of computing node the service incarnation is configured to execute on. Step 506 includes identifying a plurality of computing nodes having different types and different resource capacities. Step 508 includes jointly scheduling (i) the plurality of computing nodes and (ii) one or more of the service incarnations on the plurality of computing nodes over a time interval such that a cumulative level of performance of the service incarnations scheduled at each timepoint in the time interval satisfies the performance requirement profile of the at least one service, wherein the scheduling is based at least in part on the resource requirements of the plurality of service incarnations and the resource capacities of each of the computing nodes. Step 510 includes triggering execution of the at least one service in accordance with the scheduling.

The scheduling may be further based on time-based computing costs associated with at least a portion of the plurality of computing nodes. At least a portion of the plurality of computing nodes may be scheduled in different time periods within the time interval. The scheduling may include: scheduling incarnations for multiple services across the plurality of computing nodes for the time interval. At least two of the incarnations may be scheduled in an overlapping time period within the time interval in order to satisfy the performance requirements defined in the performance requirement profile corresponding to the overlapping time period. At least one of the plurality of computing nodes may be scheduled for a length of time that is less than a length of the time interval. The at least one service may correspond to a particular application, and the scheduling may be performed as part of an offline process. At least a portion of the plurality of computing nodes may provide on-demand computing resources from one or more cloud providers. The plurality of computing nodes may include at least two different types of computing nodes, and each type of computing node may correspond to a different level of performance. The resource capacities of the computing nodes may correspond to at least one of: processing resources, storage resources, and memory resources. The performance requirements may be measured in transactions per second. At least one of the determining and the identifying based at least in part on user input.

In some embodiments, determining cost-effectiveness of an execution unit can include determining coverage by aggregating TPS achieved by the incarnations across the services; determining the cost and incarnation installation cost; and then computing cost effectiveness based on the coverage and the costs.

An example use case of the techniques described herein includes a user having an application with multiple services using the system (e.g., cold-start service placement system 102) to obtain an efficient cluster of nodes (e.g., by purchasing low cost on-demand resources). For example, a cost model can provide the cost of the nodes as offered by a cloud provider. Another example of a use case includes a serverless environment, where a cloud provider can consider services submitted by multiple customers and plan an efficient cluster of nodes for hosting the services. In this case, a cost model can provide costs incurred by the cloud provider, for example.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 6:
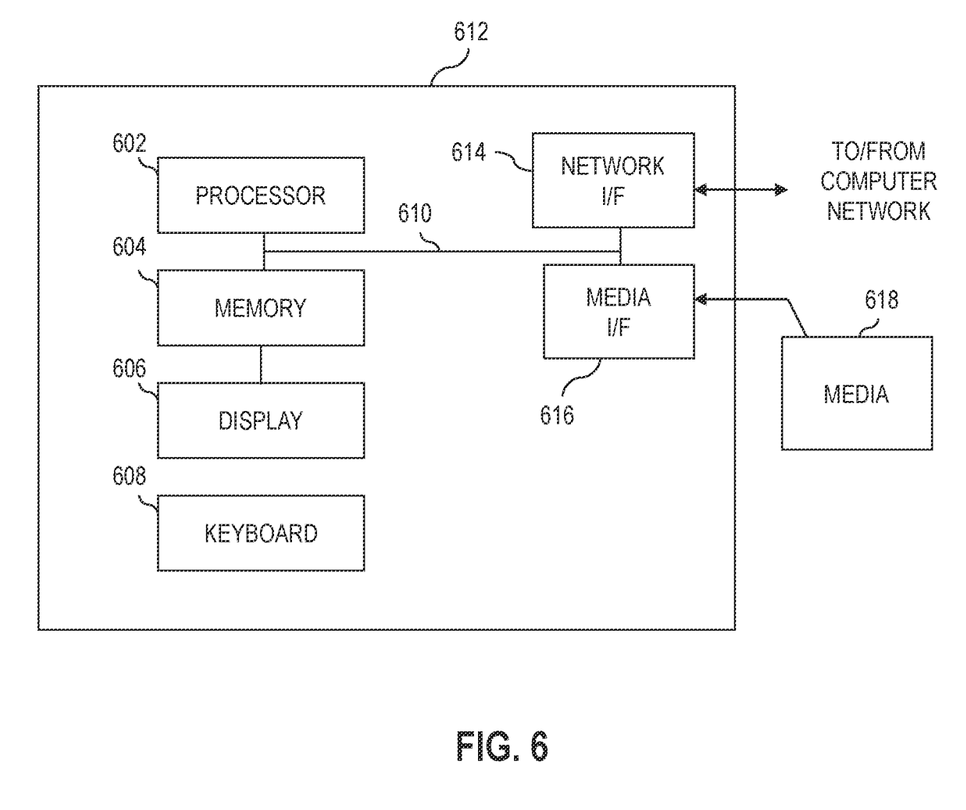
FIG. 6 is a system diagram of an exemplary computer system on which at least one embodiment of the present disclosure can be implemented.

Additionally, an embodiment of the present disclosure can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
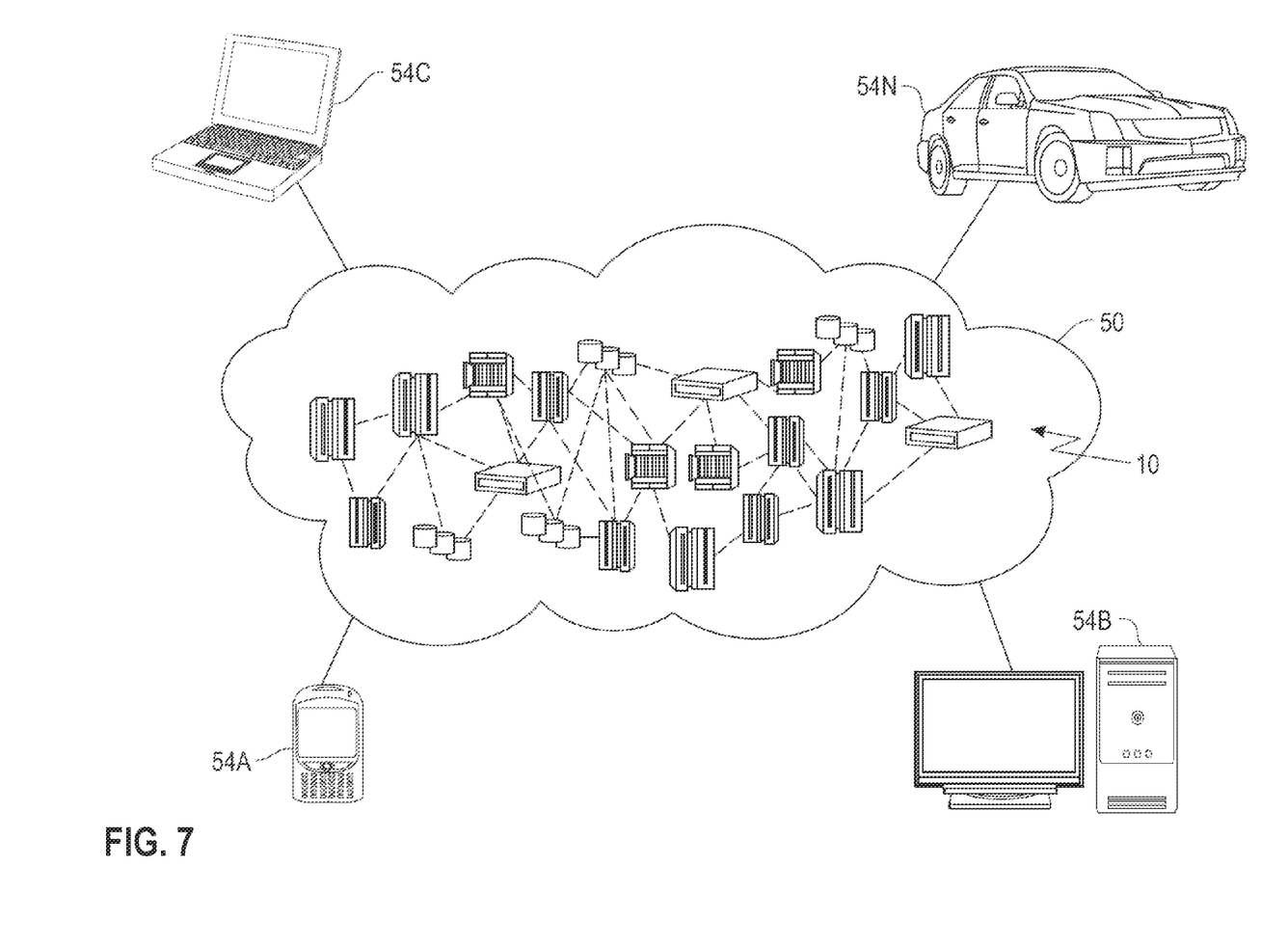
FIG. 7 depicts a cloud computing environment in accordance with exemplary embodiments.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
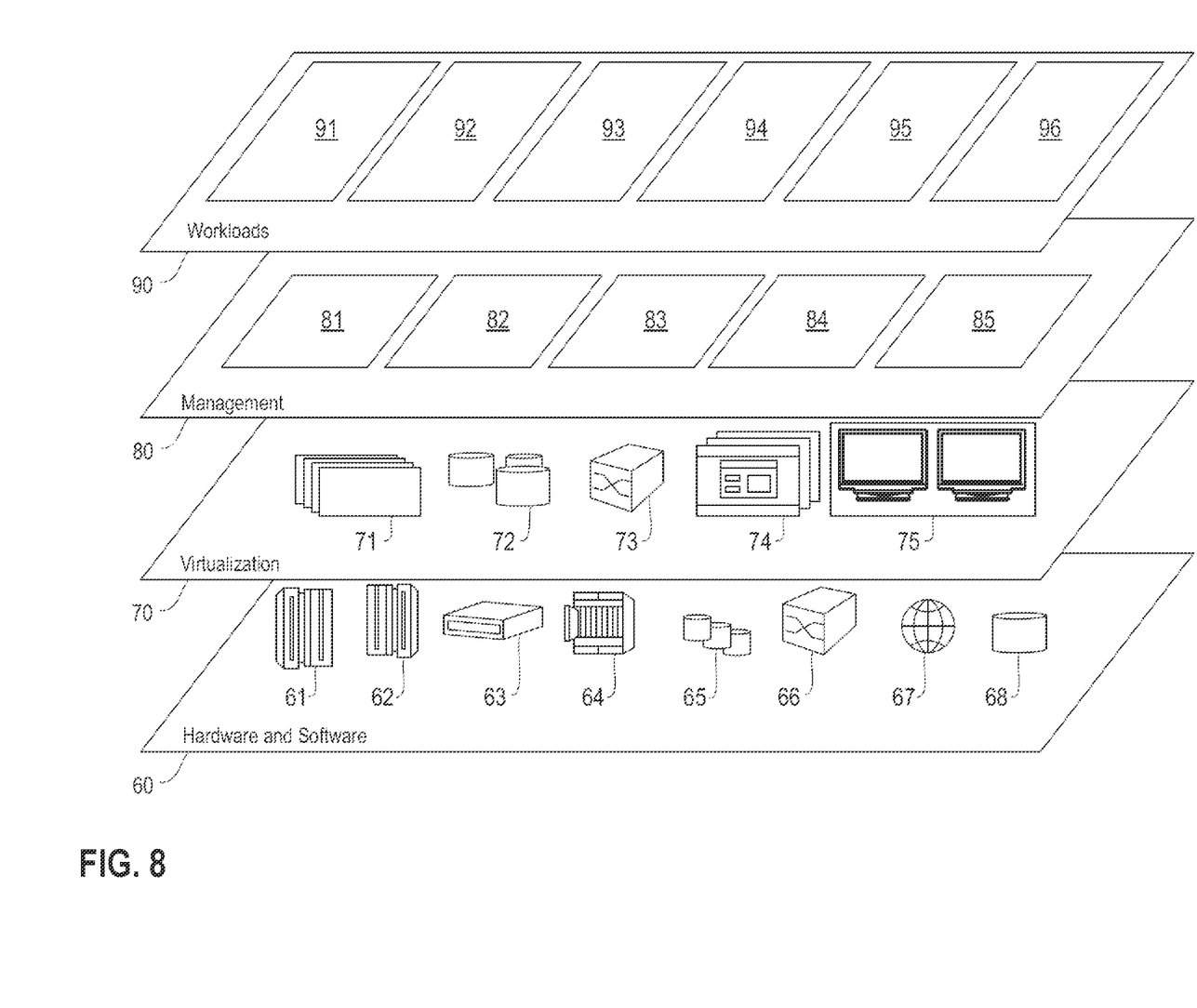
FIG. 8 depicts abstraction model layers in accordance with exemplary embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cold-start service placement 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, reducing computing costs of a cluster for executing one or services by considering the varying nature of performance requirements so that nodes can be obtained in a piecemeal manner (e.g., on an hourly basis) for the entire time period to meet these requirements. In at least some embodiments, the cost reduction is realized based on the dual scheduling of incarnations along with the nodes enables the cost reduction.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining a profile comprising performance requirements of a service that vary over time;
    determining a plurality of service incarnations for the service, wherein each service incarnation is associated with a distinct level of performance provided by the service incarnation for the service, distinct resource requirements of the service incarnation, and a computing node type the service incarnation is configured to execute on;
    identifying a plurality of computing nodes having different computing node types and different resource capacities;
    jointly scheduling the plurality of computing nodes and one or more of the plurality of service incarnations on the plurality of computing nodes over a time interval such that a cumulative level of performance of the service incarnations scheduled at each timepoint in the time interval satisfies the profile of the service, wherein the scheduling is based at least in part on the resource requirements of the plurality of service incarnations and the resource capacities of each of the computing nodes; and
    triggering execution of the service in accordance with the scheduling;
    wherein the method is carried out by at least one computing device.

2. The computer-implemented method of claim 1, wherein the scheduling is further based on time-based computing costs associated with at least a portion of the plurality of computing nodes.

3. The computer-implemented method of claim 1, wherein at least a portion of the plurality of computing nodes are scheduled in different time periods within the time interval.

4. The computer-implemented method of claim 1, wherein the scheduling comprises:
    scheduling service incarnations for one or more other services across the plurality of computing nodes for the time interval.

5. The computer-implemented method of claim 1, wherein at least two of the plurality of service incarnations for the service are scheduled in an overlapping time period within the time interval in order to satisfy the performance requirements, defined in the profile, corresponding to the overlapping time period.

6. The computer-implemented method of claim 1, wherein at least one of the plurality of computing nodes is scheduled for a length of time that is less than a length of the time interval.

7. The computer-implemented method of claim 1, wherein at least a portion of the plurality of computing nodes provide on-demand computing resources from one or more cloud providers.

8. The computer-implemented method of claim 1, wherein the plurality of computing nodes comprises at least two different computing node types, and wherein each computing node type corresponds to a different level of performance.

9. The computer-implemented method of claim 1, wherein the resource capacities of the computing nodes correspond to at least one of: processing resources, storage resources, and memory resources.

10. The computer-implemented method of claim 1, wherein the performance requirements are measured in transactions per second.

11. The computer-implemented method of claim 1, wherein at least one of the determining and the identifying is based at least in part on user input.

12. A computer program product comprising a computer readable storage medium having program instructions embodied therewith, the program instructions executable by a computing device to cause the computing device to:

obtain a profile comprising performance requirements of a service that vary over time;

determine a plurality of service incarnations for the service, wherein each service incarnation is associated with a distinct level of performance provided by the service incarnation for the service, distinct resource requirements of the service incarnation, and a computing node type the service incarnation is configured to execute on;

identify a plurality of computing nodes having different computing node types and different resource capacities;

jointly schedule the plurality of computing nodes and one or more of the plurality of service incarnations on the plurality of computing nodes over a time interval such that a cumulative level of performance of the service incarnations scheduled at each timepoint in the time interval satisfies the profile of the service, wherein the scheduling is based at least in part on the resource requirements of the plurality of service incarnations and the resource capacities of each of the computing nodes; and trigger execution of the service in accordance with the scheduling.

13. The computer program product of claim 12, wherein the scheduling is further based on time-based computing costs associated with at least a portion of the plurality of computing nodes.

14. The computer program product of claim 12, wherein at least a portion of the plurality of computing nodes are scheduled in different time periods within the time interval.

15. The computer program product of claim 12, wherein the scheduling comprises:

scheduling service incarnations for one or more other services across the plurality of computing nodes for the time interval.

16. The computer program product of claim 12, wherein at least one of the plurality of computing nodes is scheduled for a length of time that is less than a length of the time interval.

17. A system comprising:

a memory configured to store program instructions;

a processor operatively coupled to the memory to execute the program instructions to:

obtain a profile comprising performance requirements of a service that vary over time;

determine a plurality of service incarnations for the service, wherein each service incarnation is associated with a distinct level of performance provided by the service incarnation for the service, distinct resource requirements of the service incarnation, and a computing node type the service incarnation is configured to execute on;

identify a plurality of computing nodes having different computing node types and different resource capacities;

jointly schedule the plurality of computing nodes and one or more of the plurality of service incarnations on the plurality of computing nodes over a time interval such that a cumulative level of performance of the service incarnations scheduled at each timepoint in the time interval satisfies the profile of the service, wherein the scheduling is based at least in part on the resource requirements of the plurality of service incarnations and the resource capacities of each of the computing nodes; and trigger execution of the service in accordance with the scheduling.

18. The computer-implemented method of claim 4, wherein:

the service corresponds to a particular application; and the scheduling is performed as part of an offline process for initially placing the plurality of service incarnations for the service and the service incarnations for the one or more other services across the plurality of computing nodes.

19. The computer program product of claim 15, wherein:

the service corresponds to a particular application; and the scheduling is performed as part of an offline process for initially placing the plurality of service incarnations for the service and the service incarnations for the one or more other services across the plurality of computing nodes.

20. The system of claim 17, wherein:

the service corresponds to a particular application;

the scheduling comprises scheduling service incarnations for one or more other services across the plurality of computing nodes for the time interval; and the scheduling is performed as part of an offline process for initially placing the plurality of service incarnations for the service and the service incarnations for the one or more other services across the plurality of computing nodes.

* * * * *